(12) United States Patent
Janson

(10) Patent No.: US 10,221,927 B2
(45) Date of Patent: Mar. 5, 2019

(54) CONTINUOUSLY VARIABLE TRANSMISSION WITH OVERDRIVE

(71) Applicant: FORD GLOBAL TECHNOLOGIES, LLC, Dearborn, MI (US)

(72) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 14/459,347

(22) Filed: Aug. 14, 2014

(65) Prior Publication Data
US 2016/0047447 A1 Feb. 18, 2016

(51) Int. Cl.
| | | |
|---|---|---|
| *F16H 37/08* | (2006.01) | |
| *F16H 37/02* | (2006.01) | |
| *F16H 47/06* | (2006.01) | |
| *F16H 47/08* | (2006.01) | |

(52) U.S. Cl.
CPC ....... *F16H 37/022* (2013.01); *F16H 37/0846* (2013.01); *F16H 47/065* (2013.01); *F16H 47/08* (2013.01); *F16H 2037/023* (2013.01); *F16H 2037/026* (2013.01)

(58) Field of Classification Search
CPC ............. F16H 37/022; F16H 2037/023; F16H 2037/026; F16H 37/084; F16H 37/0846; F16H 47/065; F16H 47/08; F16D 2037/0866
USPC ................................. 475/210, 211, 218, 219
See application file for complete search history.

(56) References Cited

U.S. PATENT DOCUMENTS

| | | | | |
|---|---|---|---|---|
| 4,290,320 A | * | 9/1981 | Abbott | F16H 37/022 475/210 |
| 4,455,888 A | * | 6/1984 | Wayman | F16H 47/065 475/66 |
| 4,553,450 A | * | 11/1985 | Gizard | F16H 37/0846 475/212 |
| 4,864,889 A | * | 9/1989 | Sakakibara | F16H 37/0846 475/211 |
| 6,447,422 B1 | * | 9/2002 | Haka | F16H 37/0846 475/210 |
| 7,625,306 B2 | | 12/2009 | Sato | |
| 7,637,836 B2 | * | 12/2009 | Watanabe | B60K 6/365 475/209 |
| 7,682,278 B2 | | 3/2010 | Rohs et al. | |
| 2015/0184728 A1 | * | 7/2015 | Mordukhovich | F16H 37/021 74/664 |
| 2016/0305520 A1 | * | 10/2016 | Walter | F16H 61/662 |

FOREIGN PATENT DOCUMENTS

JP 62258260 A 11/1987

* cited by examiner

*Primary Examiner* — Roger L Pang
(74) *Attorney, Agent, or Firm* — James Dottavio; Brooks Kushman P.C.

(57) ABSTRACT

A transmission includes a variator configured to transmit power from a first shaft to a second shaft. The transmission further includes a first gearing arrangement configured to selectively transmit power from the second shaft to a third shaft. The first gearing arrangement transmits power at a positive speed ratio when a first clutch is engaged and at a negative speed ratio when a second clutch is engaged. The transmission also includes a second gearing arrangement configured to selectively transmit power from the first shaft to the third shaft.

7 Claims, 3 Drawing Sheets

CONTINUOUSLY VARIABLE TRANSMISSION WITH OVERDRIVE

TECHNICAL FIELD

This disclosure relates to the field of automatic transmissions for motor vehicles. More particularly, the disclosure pertains to an arrangement of gears, clutches, sprockets, chains, variators, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

Figure 1:
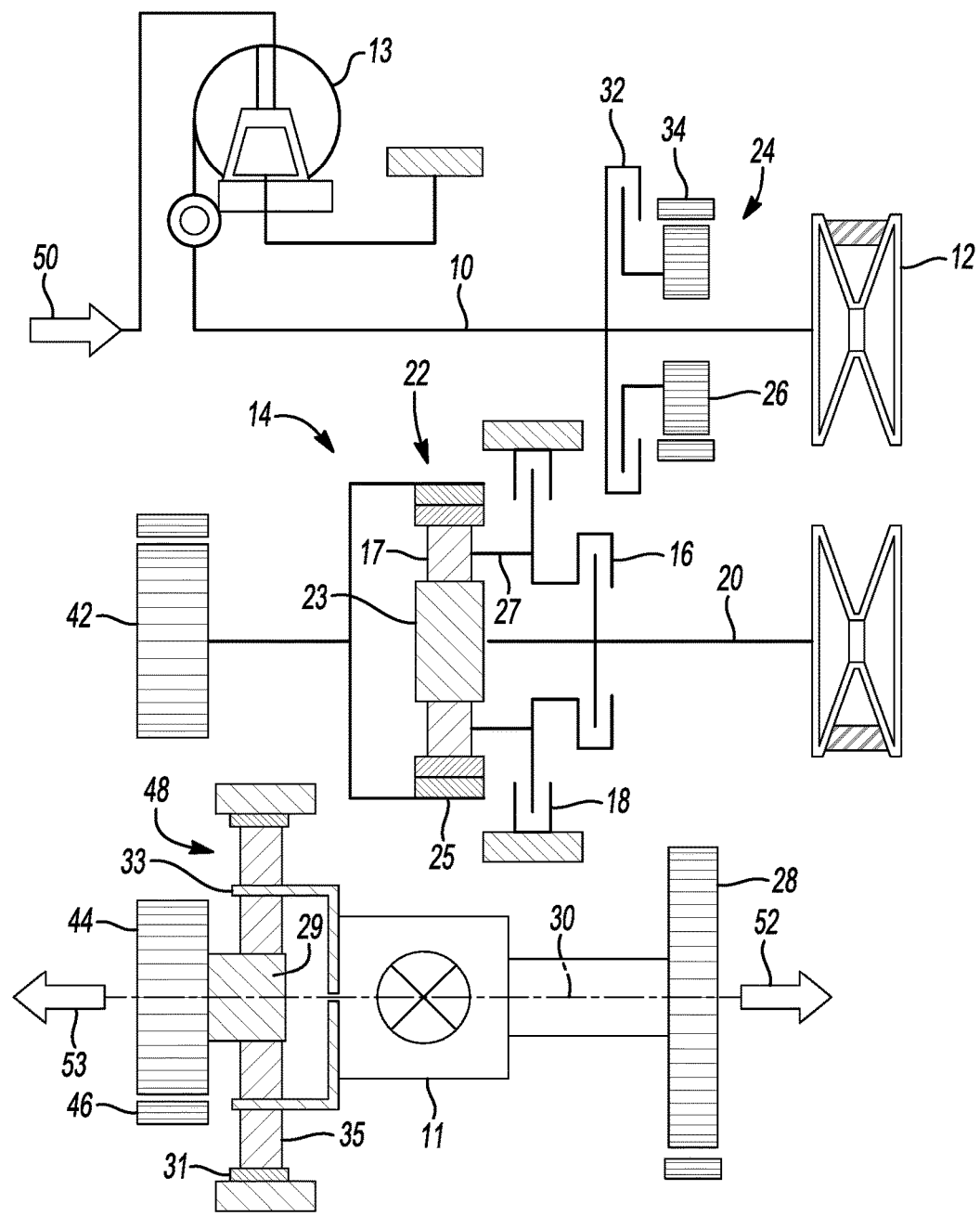
FIG. 1 is a schematic diagram of a first transmission gearing arrangement.

A transmission includes a variator, a first gearing arrangement, and a second gearing arrangement. The variator is configured to transmit power from a first shaft to a second shaft. The first gearing arrangement is configured to selectively transmit power from the second shaft to a third shaft at a positive speed ratio when a first clutch is engaged and at a negative speed ratio when a second clutch is engaged. The second gearing arrangement is configured to selectively transmit power from the first shaft to the third shaft.

A transmission includes a variator configured to transmit power from a first shaft to a second shaft and a first simple planetary gear set having a first sun gear fixedly coupled to the second shaft, a first ring gear, and a first carrier selectively coupled to the second shaft by a first clutch and selectively held against rotation by a second clutch. The transmission further includes a first sprocket selectively coupled to the first shaft by a third clutch, a second sprocket fixedly coupled to a third shaft, and a first chain engaging the first and second sprockets.

A transmission includes a variator configured to transmit power from a first shaft to a second shaft, a first simple planetary gear set having a first sun gear fixedly coupled to the second shaft, a first ring gear, and a first carrier selectively coupled to the second shaft by a first clutch and selectively held against rotation by a second clutch, and a gearing arrangement configured to selectively transmit power from the first shaft to the third shaft when a third clutch is engaged. The transmission further includes a third gear fixedly coupled with the first ring gear, a fourth gear meshing with the third gear, a fifth gear fixedly coupled with the fourth gear, and a sixth gear fixedly coupled to a third shaft and meshing with the fifth gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a clutch when the clutch constrains them to rotate as a unit whenever it is fully engaged and they are free to rotate at distinct speeds in at least some other operating condition. A clutch that holds a rotating element against rotation by selectively connecting it to the housing may be called a brake. Clutches may be actively controlled devices such as hydraulically or electrically actuated clutches or brakes or may be passive devices such as one way clutches or brakes. Two rotating elements are coupled if they are either fixedly coupled or selectively coupled.

A gearing arrangement is a collection of gearing elements and clutches configured to impose specified speed relationships among two or more shafts. Some speed relationships, called fixed speed relationships, are imposed regardless of the state of any clutches. Other speed relationships, called selective speed relationships, are imposed only when particular clutches are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A proportional speed relationship is a reverse speed relationship if the two shafts rotate in opposite directions. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

Figure 2:
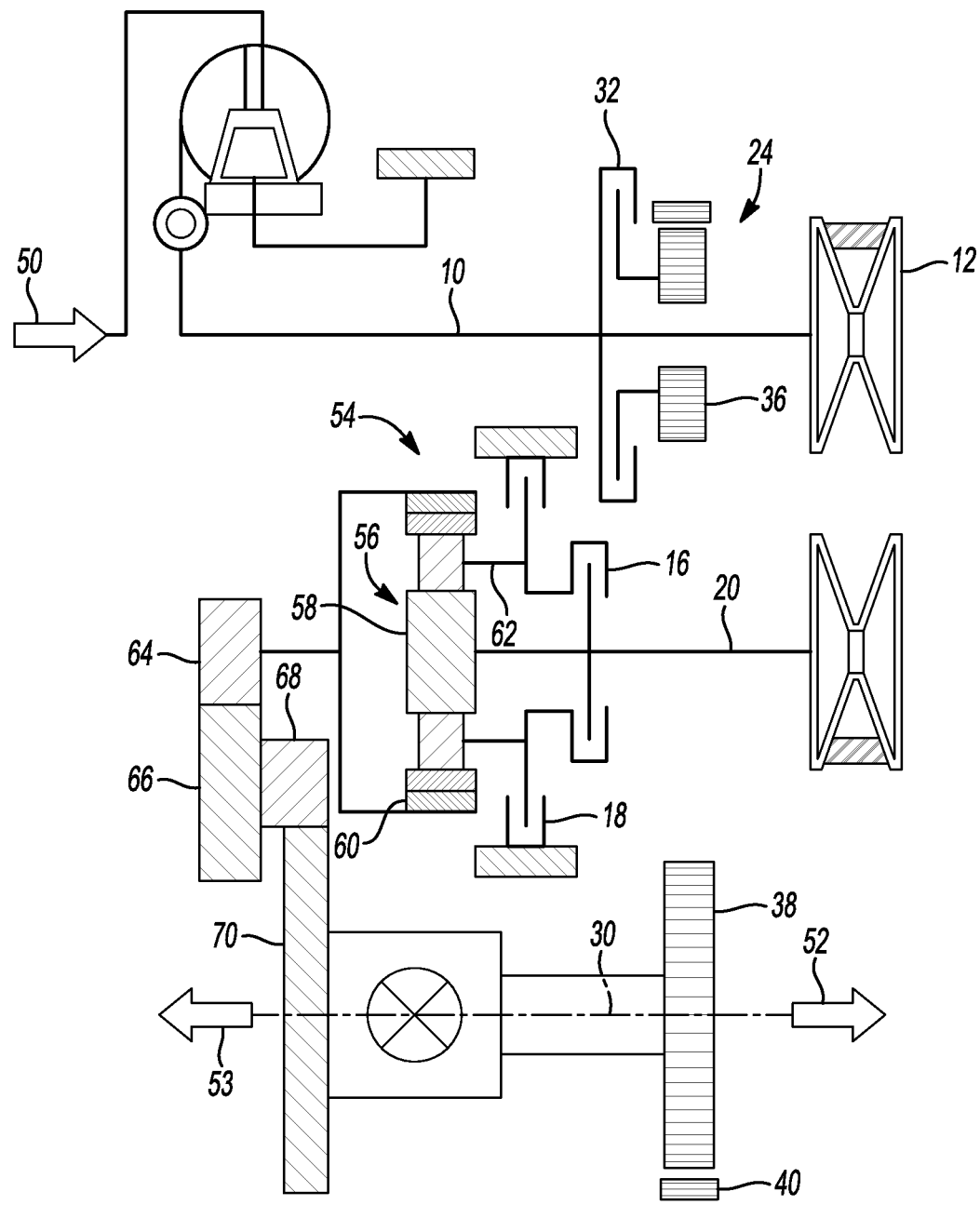
FIG. 2 is a schematic diagram of a second transmission gearing arrangement.
Figure 3:
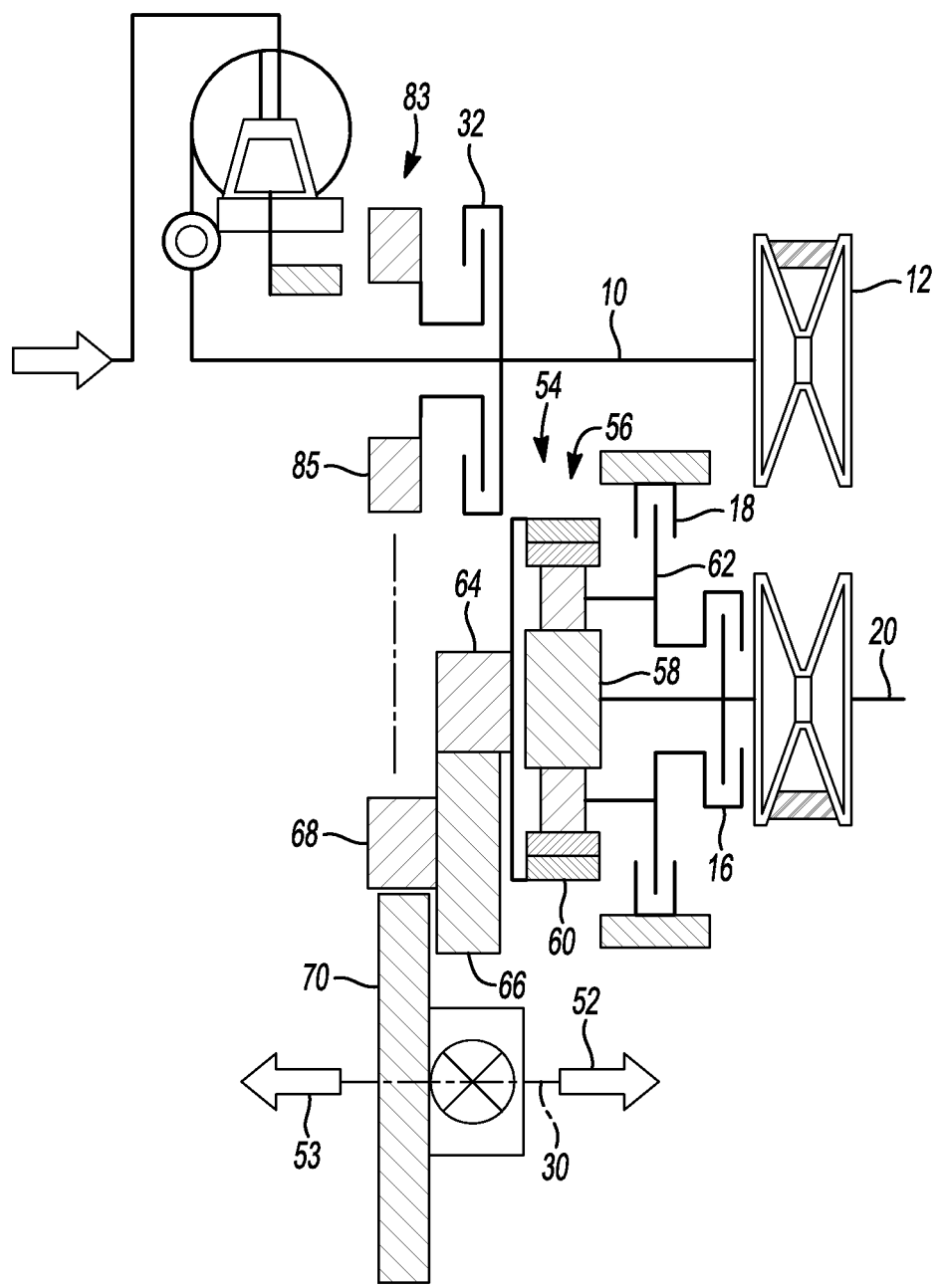
FIG. 3 is a schematic diagram of a third transmission gearing arrangement.

FIGS. 1-3 depict a transaxle that transmits power from input shaft 50 to left and right axle shafts 52 and 53 at a variety of speed ratios. Input 50 may be driven by an internal combustion engine or other prime mover. A launch device such as a torque converter 13 may be employed between the prime mover and turbine shaft 10 permitting the engine to idle while the vehicle is stationary and a transaxle ratio is selected. Axle shafts 52 and 53 drive the vehicle wheels. A differential 11 allows a slight speed difference between left and right wheels while the vehicle goes around a corner.

FIG. 1 depicts a transaxle having a turbine shaft 10, intermediate shaft 20, and a differential shaft 30. A variator 12 is configured to transmit power from the turbine shaft 10 to the intermediate shaft 20. The variator 12 is a part the transaxle that can continuously change its gear ratio. Power may be transmitted from the intermediate shaft 20 to the differential shaft 30 using a first gearing arrangement 14. The first gearing arrangement 14 selectively transmits power from the intermediate shaft 20 to the differential shaft 30 at a positive speed ratio when a first clutch 16 is engaged. The first gearing arrangement 14 selectively transmits power from the intermediate shaft 20 to the differential shaft 30 at a negative speed ratio when a second clutch 18 is engaged. A second gearing arrangement 24 selectively transmits power from the turbine shaft 10 to the differential shaft 30 when a third clutch 32 is engaged.

The first gearing arrangement 14 includes a first simple planetary gear set 22. The first simple planetary gear set 22 has a first sun gear 23 fixedly coupled to the intermediate shaft 20, a first ring gear 25, and a first carrier 27. A set of planet gears 17, supported for rotation with respect to carrier 27, mesh with both sun gear 23 and ring gear 25. The first carrier 27 is selectively coupled to the intermediate shaft 20 by the first clutch 16 and is selectively held against rotation by the second clutch 18.

In the first gearing arrangement of FIG. 1, power is transmitted from ring gear 25 to differential shaft 30 by a third sprocket 42, a fourth sprocket 44, a second chain 46, and a second simple planetary gear set 48. The third sprocket 42 is fixedly coupled with the first ring gear 25 of the first simple planetary gear set 22. The second chain 46 engages the third and fourth sprockets 42, 44. The second simple planetary gear set 48 includes a second sun gear 29 fixedly coupled to the fourth sprocket 44, a second ring gear 31 fixedly held against rotation, and a second carrier 33 fixedly coupled to the differential shaft 30. A set of planet gears 35, supported for rotation with respect to carrier 33, mesh with both sun gear 29 and ring gear 31.

The second gearing arrangement 24 includes a first sprocket 26, a second sprocket 28, and a first chain 34. The first sprocket 26 may be selectively coupled to the turbine shaft 10 by the third clutch 32 and the second sprocket 28 may be fixedly coupled to the differential shaft 30. Alternatively, the first sprocket 26 may be fixedly coupled to the turbine shaft 10 and the second sprocket 28 may be selectively coupled to the differential shaft 30. The first chain 34 engages the first 26 and second 28 sprockets. The engagement between the first chain 34 and the first and second sprockets 26, 28 allows the second gearing arrangement 24 to selectively transmit power from the turbine shaft 10 to the differential shaft 30 with very low parasitic losses.

The transaxle is prepared for forward driving by engaging first clutch 16 and setting variator 12 to an underdrive speed ratio. As the vehicle accelerates, power is transferred from input 50 to turbine shaft 10 due to slip across torque converter 13. Power is transferred from turbine shaft 50 to intermediate shaft 20 by variator 12 and then from intermediate shaft 20 to differential shaft 30 by the first gearing arrangement 14. As the vehicle speed changes, the speed ratio of variator 12 is gradually changed toward an overdrive speed ratio. In this continuously variable mode, variator 12 may be set to optimize the engine speed without discrete shift events. If torque converter 13 is equipped with a bypass clutch, the bypass clutch is engaged to reduce torque converter losses as soon as the vehicle attains a suitable speed.

When the vehicle reaches a cruising speed, the transaxle is shifted into a fixed ratio overdrive mode by gradually engaging third clutch 32 while gradually disengaging first clutch 16. The fixed ratio overdrive mode provides efficient cruising due to the high power transfer efficiency of the chain and sprocket mechanism.

The transaxle is prepared for reverse driving by engaging second clutch 18 and setting variator 12 to an appropriate speed ratio. Because the planetary gear set 22 provides torque multiplication in reverse, an intermediate variator speed ratio may be preferred over the most extreme underdrive speed ratio. As with the forward drive mode, the variator speed ratio may be continuously adjusted in reverse to optimize engine speed as vehicle speed changes.

FIG. 2 depicts another embodiment of the transaxle of the present disclosure. The transaxle in FIG. 2 may be comprised of three shafts. In some operating modes, power is transmitted from the turbine shaft 10 to an intermediate shaft 20 via a variator 12. A first gearing arrangement 54 is configured to selectively transmit power from the intermediate shaft 20 to the differential shaft 30 at either a positive or a negative speed ratio. A second gearing arrangement 24 is configured to selectively transmit power from the turbine shaft 10 to the differential shaft 30.

The first gearing arrangement 54 includes a first simple planetary gear set 56. The first simple planetary gear set 56 includes a first sun gear 58, a first ring gear 60, and a first carrier 62. The first sun gear 58 is fixedly coupled to the intermediate shaft 20. The first carrier 62 is selectively coupled to the intermediate shaft 20 by a first clutch 16 and selectively held against rotation by a second clutch 18. In order to transmit power from the ring gear 60 to the differential shaft 30, the first gearing arrangement 54 may utilize a layshaft gears.

The first gearing arrangement 54, in addition to the first simple planetary gear set 56, includes a third gear 64, a fourth gear 66, a fifth gear 68, and a sixth gear 70. The third gear 64 is fixedly coupled with the first ring gear 60 of the first simple planetary gear set 56. The fourth gear 66 meshes with the third gear 64. The fifth gear 68 and the fourth gear 66 are fixedly coupled to one another and are supported for rotation about an offset axis parallel to the axes of intermediate shaft 20 and differential shaft 30. The sixth gear 70 meshes with the fifth gear 68 and is fixedly coupled to the differential shaft 30.

The second gearing arrangement of FIG. 2 is similar to the second gearing arrangement of FIG. 1 described above. The transaxle of FIG. 2 is operated in the same manner as the transaxle of FIG. 1 to realize the same advantages.

FIG. 3 depicts another embodiment of the transaxle the present disclosure. The transaxle of FIG. 3 is configured to transmit power through three shafts. A variator 12 transmits power from a turbine shaft 10 to an intermediate shaft 20. A first gearing arrangement 54 selectively transmits power from the intermediate shaft 20 to a differential shaft 30. The first gearing arrangement 54 of FIG. 3 is similar to the first gearing arrangement 54 of FIG. 2 described above. Further, a second gearing arrangement 83 is configured to selectively transmit power from the turbine shaft 10 to the differential shaft 30.

The second gearing arrangement 83 may be comprised of a first gear 85, gear 70, and gear 68. The first gear 85 may be selectively coupled to the turbine shaft 10 by the third clutch 32. Gear 70 may be fixedly coupled to the differential shaft 30. Gear 68 meshes with the first gear 85, as indicated by a dashed line, and with gear 70. The first gearing arrangement 54 shares gears with the second gearing arrangement 83. In other words, gears 68 and 70 are part of both the first gearing arrangement 54 and the second gearing arrangement 83. This allows for a reduction of the total number of gears required for the transaxle depicted in FIG. 3. Adding an additional shaft with a second gear acting as an idler gear by meshing with the first gear 85 with gear 70 is possible. The gear drive between the first gear 85 and gear 70 may have a speed ratio of 0.65:1.

The transaxle of FIG. 3 is operated in the same manner as the transaxle of FIG. 1 described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    a variator configured to transmit power from a first shaft to a second shaft;
    a first gearing arrangement configured to selectively transmit power from the second shaft to a third shaft at a positive speed ratio when a first clutch is engaged and at a negative speed ratio when a second clutch is engaged, and including:
        a first planetary gear set having a first sun gear fixedly coupled to the second shaft, and a first carrier selectively coupled to the second shaft by the first clutch and selectively held against rotation by the second clutch;
        a third sprocket fixedly coupled with a first ring gear;
        a fourth sprocket;
        a second chain engaging the third and fourth sprocket; and
    a second simple planetary gear set having a second sun gear fixedly coupled to the fourth sprocket, a second ring gear fixedly held against rotation, and a second carrier fixedly coupled to the third shaft; and
    a second gearing arrangement configured to selectively transmit power from the first shaft to the third shaft.

2. The transmission of claim 1, wherein the second gearing arrangement comprises:
    a first sprocket selectively coupled to the first shaft by a third clutch;
    a second sprocket fixedly coupled to the third shaft; and
    a first chain engaging the first and second sprockets.

3. The transmission of claim 1, wherein the second gearing arrangement comprises:
    a first gear selectively coupled to the first shaft by a third clutch;
    a second gear fixedly coupled to the third shaft; and
    a third gear meshing with the first and second gears.

4. The transmission of claim 1, further comprising a torque converter having an impeller fixedly coupled to an input shaft and a turbine fixedly coupled to the first shaft.

5. A transmission comprising: a variator configured to transmit power from a first shaft to a second shaft; a first gearing arrangement configured to selectively alternately establish fixed positive and negative speed ratios between the second shaft and a third shaft, fixedly coupled to a differential, in response to engagement of first and second clutches respectively; and a second gearing arrangement configured to selectively establish a fixed positive speed ratio between the first and third shafts.

6. The transmission of claim 5 wherein the first gearing arrangement comprises:
    a first planetary gearset having a first sun gear fixedly coupled to the second shaft, a first carrier selectively coupled to the second shaft by the first clutch and selectively held against rotation by the second clutch, and a first ring gear;
    a second planetary gearset having a second sun gear, a second carrier fixedly coupled to the third shaft, and a second ring gear fixedly held against rotation; and
    a second chain configured to transmit power from the first ring gear to the second sun gear.

7. The transmission of claim 5 wherein the second gearing arrangement comprises:
    a first sprocket selectively coupled to the first shaft by a third clutch:
    a second sprocket fixedly coupled to the third shaft; and
    a chain engaging the first and second sprockets.

\* \* \* \* \*